US006625538B2

(12) United States Patent
Stefan et al.

(10) Patent No.: US 6,625,538 B2
(45) Date of Patent: Sep. 23, 2003

(54) METHOD AND SYSTEM FOR REDUCING MANEUVER PROXIMITY DIAMETER FOR A WAYPOINT NAVIGATION SYSTEM

(75) Inventors: Jeffrey M. Stefan, Clawson, MI (US); Daniel N. Aloi, Rochester Hills, MI (US); Richard J. Kacel, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/001,579

(22) Filed: Nov. 1, 2001

(65) Prior Publication Data

US 2003/0083808 A1 May 1, 2003

(51) Int. Cl.[7] .................. G06F 165/00; G01C 21/00
(52) U.S. Cl. .................. 701/207; 701/200; 340/910
(58) Field of Search .................. 701/200, 201, 701/202, 207, 209, 210, 211, 208, 203, 212; 340/910, 988, 990, 995

(56) References Cited

U.S. PATENT DOCUMENTS 5,737,225 A * 4/1998 Schulte .................. 364/449.5
5,904,728 A * 5/1999 Tamai et al. .................. 701/211
5,951,621 A * 9/1999 Palalau et al. .................. 701/200
6,108,604 A * 8/2000 Fukaya et al. .................. 701/211
6,249,740 B1 * 6/2001 Ito et al. .................. 701/200
6,397,145 B1 * 5/2002 Millington .................. 701/211

* cited by examiner

Primary Examiner—Tan Q. Nguyen
Assistant Examiner—Dalena Tran
(74) Attorney, Agent, or Firm—Anthony Luke Simon

(57) ABSTRACT

The present invention provides a system, a method, and a computer usable medium that includes a program, for generating navigation instructions for a vehicle. This may be done by determining whether a first proximity area associated with a first maneuver point overlaps with a second maneuver proximity area associated with a second maneuver point and determining whether a first vehicle location is within the first proximity area. It may also be done by determining a first distance between the first vehicle location and a zero point associated with the first maneuver point and determining a second distance between a second vehicle location and the zero point associated with the first maneuver point. It may also be one by truncating the first proximity area based on a comparison of the first distance and the second distance.

13 Claims, 4 Drawing Sheets

200

METHOD AND SYSTEM FOR REDUCING MANEUVER PROXIMITY DIAMETER FOR A WAYPOINT NAVIGATION SYSTEM

FIELD OF THE INVENTION

This invention relates generally to the navigation of a moving vehicle. In particular, this invention relates to a method and system for decreasing the maneuver proximity diameter to increase performance of a low cost server-based waypoint navigation system.

BACKGROUND OF THE INVENTION

With the many advances that have been made in vehicle navigation over the last few years, there still exists the challenge to design facilities (equipment and methods) that are reliable, speedy and most important, accurate. As the equipment technology continues to evolve, new methods of determining information such as, position, speed, bearing and expected time of arrival are also evolving.

One of these methods is "waypoint navigation," where points are used to guide a vehicle in motion. Waypoints may represent electronic addresses that have been predetermined and used as milestones for vehicles navigating along a specific route. The waypoints on a route can be for example, a starting position, a destination position, and various maneuver points that present directional instruction (i.e., turn right, go straight, etc.). As a vehicle is navigating along a path, and as it approaches a waypoint, the navigation system can automatically calculate the distance and bearing to a predetermined position, for example, the next maneuver point.

Because the longitudinal and latitudinal profile of this previously determined position is known, distance and bearing information with respect to this position can be continuously calculated and monitored as a vehicle passes through waypoints on route to this position. These waypoints may provide indication that the navigating vehicle is in close proximity to a maneuver point. Depending on the distance calculation to a maneuver proximity area and to the center area of maneuver point position, determination can be made whether the vehicle has passed a maneuver point and is approaching the proximity area of the next maneuver point on an planned route.

Often, the proximity area associated with a predetermined position is located too close to the proximity area of a next predetermined position and can cause inaccuracies, or at a minimum, can increase the complexity of navigation position information processing. This increase in complexity can cause an increase in time required to process navigation information and may warrant additional computing resources, which may cause an increase in operating costs.

It would be desirable therefore to provide a method that overcomes the above disadvantages and provides more effective and timely navigation instructions to a moving vehicle.

SUMMARY OF THE INVENTION

One aspect of the present invention provides a method for generating navigation instructions for a vehicle. It may be determined whether a first proximity area associated with a first maneuver point overlaps with a second maneuver proximity area associated with a second maneuver point. It may also be determined whether a first vehicle location is within the first proximity area. A first distance between a first vehicle location and a zero point associated with the first maneuver point may be determined and a second distance between a second vehicle location and the zero point associated with the first maneuver point may be determined. The first proximity area may be truncated based on a comparison of the first distance and the second distance.

Another aspect of the present invention provides a system for generating navigation instructions for a vehicle. The system may include means for determining whether a first proximity area associated with a first maneuver point overlaps with a second maneuver proximity area associated with a second maneuver point and means for determining whether a first vehicle location is within the first proximity area. It may also include means for determining a first distance between the first vehicle location and a zero point associated with the first maneuver point and means for determining a second distance between a second vehicle location and the zero point associated with the first maneuver point. It may also include means for truncating the first proximity area based on a comparison of the first distance and the second distance Another aspect of the present invention provides a computer usable medium including a program for generating navigation instructions for a vehicle. The program may include computer readable program code that determines whether a first proximity area associated with a first maneuver point overlaps with a second maneuver proximity area associated with a second maneuver point and computer readable program code that determines whether a first vehicle location is within the first proximity area. It may also include computer readable program code that determines a first distance between the first vehicle location and a zero point associated with the first maneuver point and computer readable program code that determines a second distance between a second vehicle location and the zero point associated with the first maneuver point. It may also include computer readable program code that truncates the first proximity area based on a comparison of the first distance and the second distance.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
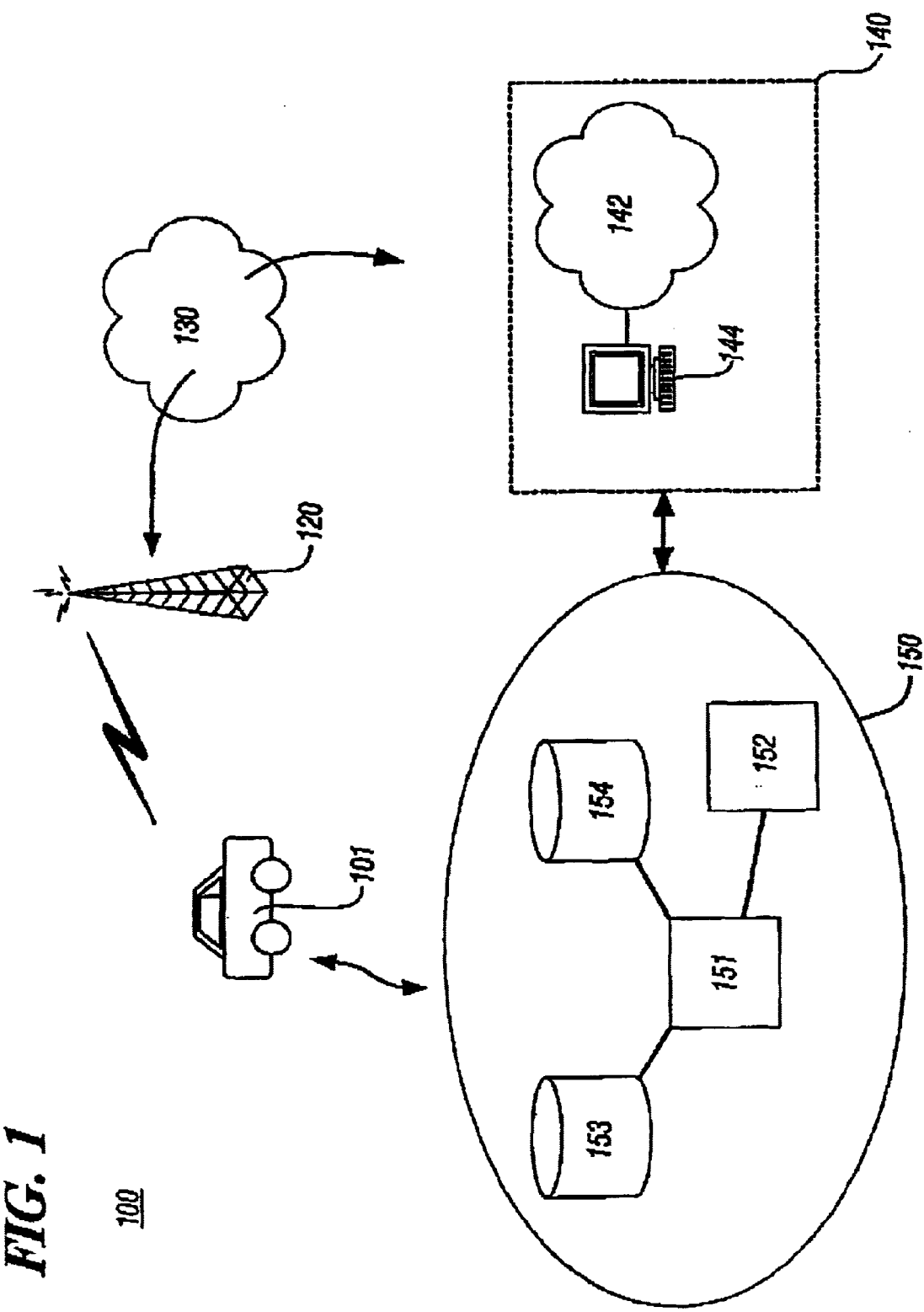
FIG. 1 is a schematic diagram of one embodiment of a system for generating navigation information for a vehicle in accordance with the present invention.

FIG. 1 shows one embodiment of a system for providing services to a vehicle in accordance with the present invention at 100. The system may include one or more vehicle clients 101, one or more carrier systems 120, one or more communication networks 130, one or more service management subsystems 140, and one or more navigation subsystems 150. The service management subsystems may comprise one or more service management applications 142 and one or more service managers 144. The navigation subsystems 150 may comprise one or more route applications 151, 152 and one or more coordinate databases 153, 154.

Navigation subsystem 150 is a system for generating routes to be delivered to vehicle client 101 and for receiving route information from vehicle client 101. Navigation subsystem 150 may be connected with or in communication with service management subsystem 140. Service management subsystem 140 may be used to manage the delivery of information to or from navigation subsystem 150 and to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 101. In one embodiment of the invention, navigation subsystem 150 comprises one or more route applications 151, 152 and one or more coordinate databases 153, 154. For example, route applications 151, 152 may be any suitable software application for generating route information or otherwise processing route information. Coordinate databases 153, 154 may be any suitable databases for storing route information, such as location coordinates.

Vehicle client 101 may be any suitable vehicle. For example, the vehicle may be an automobile or a passenger-carrying unit such as a bus or train. Alternatively, vehicle client 101 may be an occupant of the vehicle or any suitable client device contained in the vehicle. In one embodiment of the invention, vehicle client 101 is a mobile or portable device equipped to communicate with service management subsystem 140. Carrier system 120 is any suitable system for transmitting a signal from vehicle 101 to service management subsystem 140. Carrier system 120 may also transmit a signal from service management subsystem 140 to vehicle client 101. In one embodiment of the invention, carrier system 120 is a wireless carrier system as is well known in the art. Carrier system 120 may be for example, a transmitter/receiver unit attached to vehicle client 101. Alternatively, carrier system 120 may be a separate transmitter/receiver carried by vehicle client 101.

Communication network 130 is any suitable system for communicating between vehicle client 101 and service management subsystem 140. In one embodiment of the invention, communication network is a public switched telephone network (PSTN). Alternatively, communication network 130 may be a multiprotocol Internet or Intranet capable of transmitting voice and/or data in either analog or digital form or a combination of both. Alternatively, communication network 130 may be a hybrid communication network or virtual network.

Service management subsystem 140 is a system for managing a variety of services to be delivered to or from vehicle client 101. In one embodiment of the invention, service management subsystem 140 manages services that can be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
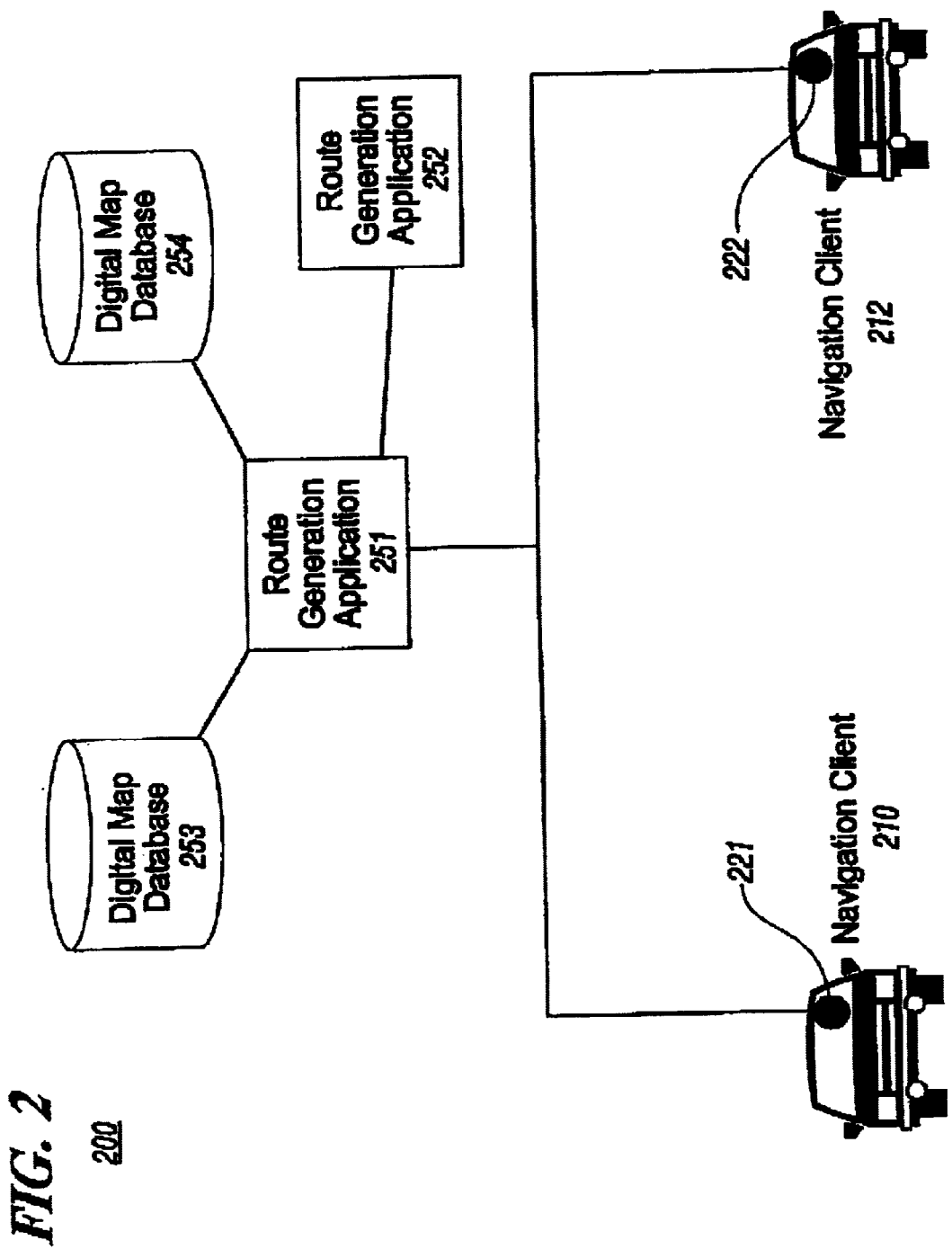
FIG. 2 is a schematic diagram of another embodiment of a system for determining navigation instructions for a vehicle in accordance with the present invention.

FIG. 2 shows one embodiment of a navigation system in accordance with the present invention at 200. Navigation system 200 may include one or more navigation clients 210, 212. Each navigation client 210, 212 may have an in-vehicle navigator 221, 222. Navigation system 200 may also include one or more route generation applications 251, 252. Navigation system 200 may also include one or more coordinate databases 253, 254.

Navigation clients 210, 212 may be one or more vehicle clients as described above.

In-vehicle navigator 221, 222 may be any suitable component of navigation client 210, 212, which may be used to navigate vehicle client 210, 212. For example, in-vehicle navigator 221, 222 may be a driver. Alternatively, in-vehicle navigator 221, 222 may be an automatic system for navigating vehicle 210,212.

Route generation applications 251, 252 may be any suitable application for calculating maneuver lists of directions between one or more locations. For example, route generation applications 251, 252 may be any suitable software or hardware programs for managing or calculating routes, portions of routes or route coordinates. Route generation applications may include or may be able to calculate routes from navigation client's current location to private residences, businesses or recreational facilities. In one embodiment of the invention, route generation applications 251, 252 are in communication with coordinate databases 253, 254.

Route generation applications 251, 252 may generate navigation information in any suitable manner. For example, route generation applications 251, 252 may generate routes using geocoding. That is, the application 251, 252 determines a corresponding latitude and longitude based on an input navigation address. Alternatively, route generation applications 251, 252 may generate routes using reverse geocoding. That is, the application 251, 252 determines a corresponding navigation address based on input latitude and longitude coordinates.

Coordinate databases 253, 254 may be any suitable databases for storing such location coordinates as latitude and longitude of a variety of locations. These locations may be, for example, points of interest. Coordinate databases 253, 254 may also be a database of street addresses. Coordinate databases 253, 254 may also be a database of routes between points.

Figure 3:
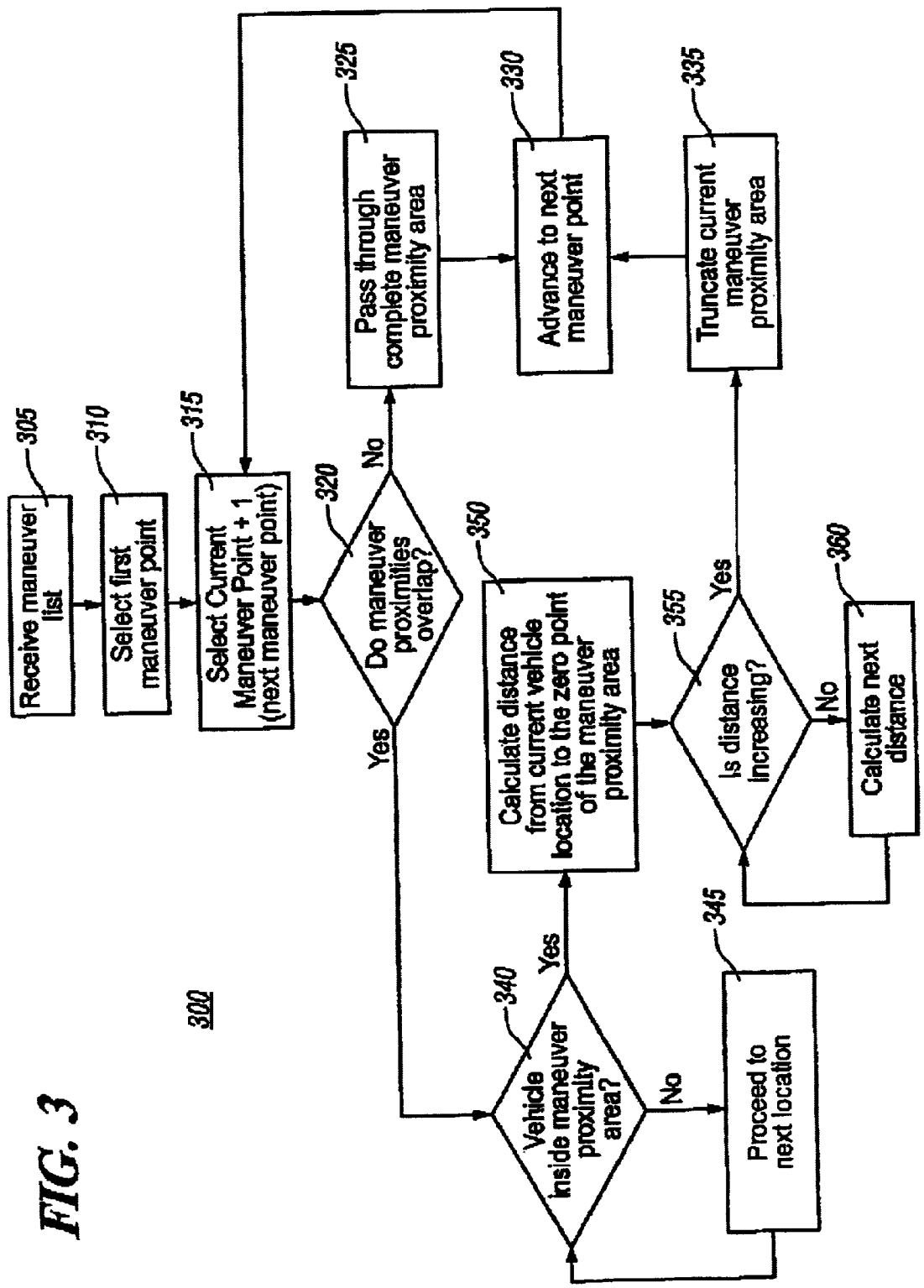
FIG. 3 is a flow diagram of one embodiment of a method for determining navigation instructions for a vehicle in accordance with the present invention.
Figure 4:
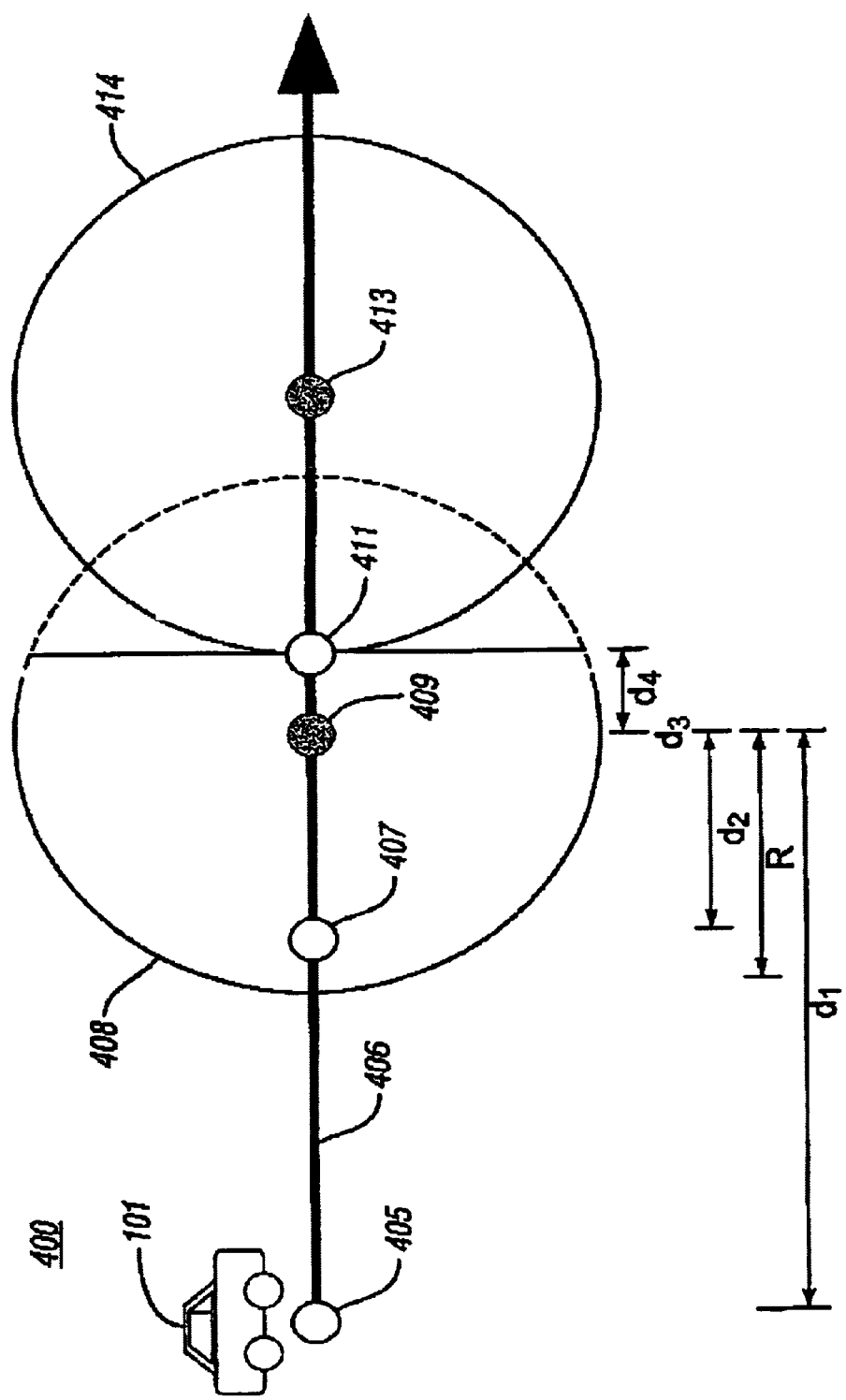
FIG. 4 is a sequence diagram of one embodiment of a method for determining navigation instructions for a vehicle in accordance with the present invention.

FIGS. 3 and 4 show a flow diagram (shown generally at 300) and sequence diagram (shown generally at 400) illustrating one embodiment of a method for reducing the maneuver proximity diameter to determine navigation instructions for a vehicle in accordance with the present invention.

In one embodiment, the client vehicle 101 may establish communication with the navigation subsystem 150 and receive a maneuver list (block 305). The maneuver list may include maneuver points, shape points and road segments located on a route 406. As the vehicle is navigating and as the vehicles location is within a certain proximity area of a maneuver point listed on the maneuver list, navigation instructions (i.e., turn right, go straight, etc.) may be presented to the client vehicle 101.

As the client vehicle begins travelling along route 406 a first maneuver point may be selected as a planned final destination (block 310). Each maneuver point may have an associated maneuver proximity area. In one embodiment, a perimeter of the proximity area may have the radius (R). The radius R may be user defined, for example, by a keyboard entry or automatically determined by navigation server computer code. In one embodiment, upon crossing through the perimeter a notification may be sent to the vehicle. In one embodiment, the notification may be an audible sound, or visual display on an onboard vehicle device as is well known in the art.

A determination is made as to whether the associated consecutive maneuver point proximity areas 408, 414 for the first and second zero points 409, 413 overlap (block 320).

If the maneuver proximities overlap, it may be determined whether the vehicle is inside the first maneuver proximity area (block 340) and if it is not, the vehicle may keep moving to the next position until it is inside the first maneuver proximity area (block 345).

As the client vehicle is navigating on route 406 inside the maneuver proximity area toward the zero point, the navigation subsystem 150 may automatically calculate the distance and bearing from the vehicle's current location to a zero point at the center of the maneuver point proximity area (block 350). As the distance from the current location to the zero point is changing, it may be continually calculated and displayed by the navigation subsystem 150. A determination can be made on whether the distance between the current vehicle position and the zero point is decreasing or increasing (block 355). If the distance is decreasing, the vehicle is "counting down", which means the vehicle is still approaching the zero point. This calculating may continue (block 360) until the distance begins to increase or "count up." This indicates that the zero point has been passed and the current maneuver point proximity area may be truncated (block 335). Advancement may then be made to the next maneuver point (block 330) which becomes the current maneuver point. The proximity area of the current maneuver point and next consecutive maneuver point may be selected for analysis (block 315). This process continues until all of the maneuver points on the maneuver list have been analyzed.

FIG. 4 is a sequence diagram, illustrating an example of one embodiment of a method for reducing the maneuver proximity diameter to generate navigation information for a vehicle in accordance with the present invention at 400.

Points 409 and 413 are longitude and latitude zero points of respective maneuver point proximity areas. Point 405 is the starting point of vehicle client 101 navigating on route 406.

The onboard vehicle client 101 may select the first maneuver point 409 and the second maneuver point 413 for analysis. The vehicle then navigates toward the first maneuver point 409 and crosses point 407 on route 406. In this embodiment, it is determined that the maneuver proximity area 408 of the first maneuver point 409 overlaps the maneuver proximity area 414 of the second consecutive maneuver point 413. It is also determined that the current location of the vehicle at point 407 is within the proximity area 408 of the first maneuver point 409.

The onboard navigation system may continually calculate the distance from the current location of the vehicle client to the maneuver proximity zero point 409. At the starting point 405, the distance d1 and bearing values from its location to the maneuver proximity zero point 409 may be calculated. The maneuver proximity zero point 409 may be the exact location of the maneuver point that when reached, a maneuver instruction (i.e., turn right, go straight, etc.) may be transmitted to an output device (i.e., Display, LED readout, audible electronic voice generator, etc.) within the navigation subsystem 150. The navigation subsystem 150 may automatically calculate the distance d2 and bearing from the current vehicle location 407 to the longitude and latitude zero point 409 by a technique known in the art. The navigation system may compare this second distance d2 to the previous distance d1 from the starting point 405 to the first maneuver proximity area zero point 409. Because d2 does not exceed d1, the navigation subsystem 150 may be determined to be "counting down" indicating that the client vehicle may be traveling closer to the maneuver proximity zero point 409. In one embodiment, there may be a display device that highlights this counting down or "closing in" on the zero point 409.

The vehicle may then travel to the maneuver proximity area zero point 409 and may transmit its current location to the navigation subsystem 150. The distance d3 from the maneuver proximity zero point 409 to itself may be dynamically calculated on the navigation subsystem 150. Because the distance from any point to the same point is equal to zero, the navigation subsystem 150 calculates the distance d3 equal to a value of zero. The vehicle continues to navigate and when it arrives at its next location point 411, the navigation system dynamically calculates the distance d4 from the maneuver proximity area zero point 409 to its current location point 411 on route 406. Because d4 exceeds the previous distance d3, the navigation system may determine that the maneuver proximity zero point 409 has been passed. The navigation system may truncate the maneuver proximity at this point 411 and begin calculating distance from point 411 to zero point 413. Accordingly, no further measurements will be made between location points and zero point 409.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of determining navigation instructions for a vehicle, comprising:

determining whether a first proximity area associated with a first maneuver point overlaps with a second maneuver proximity area associated with a second maneuver point;

determining whether a first vehicle location is within the first proximity area;

determining a first distance between the first vehicle location and a zero point associated with the first maneuver point;

determining a second distance between a second vehicle location and the zero point associated with the first maneuver point; and truncating the first proximity area based on a comparison of the first distance and the second distance.

2. The method of claim 1, further comprising:

determining a distance from a third vehicle location to a second zero point associated with a second maneuver point.

3. The method of claim 1, wherein the first and second proximity areas are determined by extending a radius from the associated maneuver point.

4. The method of claim 1, wherein determining whether a first vehicle location is within the first proximity area comprises comparing the distance between the vehicle location and the zero point associated with the first proximity area to the proximity area radius.

5. The method of claim 1, further comprising:
   determining a distance between a current vehicle location and the zero point associated with the first proximity area by comparing the longitude and latitude value of the vehicle location to the longitude and latitude value of the zero point associated with the first proximity area.

6. A computer usable medium including a program for generating navigation instructions for a vehicle, comprising:
   computer readable program code that determines whether a first proximity area associated with a first maneuver point overlaps with a second maneuver proximity area associated with a second maneuver point;
   computer readable program code that determines whether a first vehicle location is within the first proximity area;
   computer readable program code that determines a first distance between the first vehicle location and a zero point associated with the first maneuver point;
   computer readable program code that determines a second distance between a second vehicle location and the zero point associated with the first maneuver point; and
   computer readable program code that truncates the first proximity area based on a comparison of the first distance and the second distance.

7. The computer usable medium of claim 6, further comprising:
   computer readable program code that determines a distance from a third vehicle location to a second zero point associated with a second maneuver point.

8. The computer usable medium of claim 6, wherein the first and second proximity areas are determined by extending a radius from the associated maneuver point.

9. The computer usable medium of claim 6, wherein determining whether a first vehicle location is within the first proximity area comprises comparing the distance between the vehicle location and the zero point associated with the first proximity area to the proximity area radius.

10. The computer usable medium of claim 6, further comprising:
    computer readable program code that determines a distance between a current vehicle location and the zero point associated with the first proximity area by comparing the longitude and latitude value of the vehicle location to the longitude and latitude value of the zero point associated with the first proximity area.

11. A system for generating navigation instructions for a vehicle, comprising:
    means for determining whether a first proximity area associated with a first maneuver point overlaps with a second maneuver proximity area associated with a second maneuver point;
    means for determining whether a first vehicle location is within the first proximity area;
    means for determining a first distance between the first vehicle location and a zero point associated with the first maneuver point;
    means for determining a second distance between a second vehicle location and the zero point associated with the first maneuver point; and
    means for truncating the first proximity area based on a comparison of the first distance and the second distance.

12. The system of claim 11, further comprising
    means for determining a distance from a third vehicle location to a second zero point associated with a second maneuver point.

13. The system of claim 11, further comprising:
    means for determining a distance between a current vehicle location and the zero point associated with the first proximity area by comparing the longitude and latitude value of the vehicle location to the longitude and latitude value of the zero point associated with the first proximity area.

* * * * *